(12) United States Patent
Haga

(10) Patent No.: US 12,374,912 B2
(45) Date of Patent: Jul. 29, 2025

(54) POWER SUPPLY SYSTEM AND MOVING OBJECT

(71) Applicant: HONDA MOTOR CO., LTD., Tokyo (JP)

(72) Inventor: Hisao Haga, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 18/607,647

(22) Filed: Mar. 18, 2024

(65) Prior Publication Data

US 2024/0322583 A1 Sep. 26, 2024

(30) Foreign Application Priority Data

Mar. 22, 2023 (JP) ................................ 2023-045128

(51) Int. Cl.
*H02J 7/00* (2006.01)
*B60L 50/61* (2019.01)
*B64D 27/34* (2024.01)

(52) U.S. Cl.
CPC ............ *H02J 7/0068* (2013.01); *B64D 27/34* (2024.01); *B60L 50/61* (2019.02)

(58) Field of Classification Search
None
See application file for complete search history.

(56) References Cited

U.S. PATENT DOCUMENTS

| | | | | |
|---|---|---|---|---|
| 2018/0354635 | A1* | 12/2018 | Wagner | B64D 31/18 |
| 2021/0339850 | A1* | 11/2021 | Predonu | B64C 27/10 |
| 2022/0250755 | A1* | 8/2022 | Hull | B60L 58/10 |
| 2023/0312116 | A1* | 10/2023 | Han | B64D 27/02 244/53 R |
| 2025/0091723 | A1* | 3/2025 | Spitzer | B60L 58/13 |

FOREIGN PATENT DOCUMENTS

| | | |
|---|---|---|
| JP | 2019-023464 A | 2/2019 |
| JP | 2019-077361 A | 5/2019 |

* cited by examiner

*Primary Examiner* — Jared Fureman
*Assistant Examiner* — Aqeel H Bukhari
(74) *Attorney, Agent, or Firm* — Rankin, Hill & Clark LLP

(57) ABSTRACT

A power supply system includes: a prediction unit that, based on required power, generated power, and a current SOC of a power storage device, predicts a predicted SOC that is an SOC of the power storage device obtained after a predetermined time; a correction power amount determination unit that determines a correction power amount used for reducing a deviation between the predicted SOC and a target SOC to be achieved; a target generated power correction unit that determines corrected target generated power by correcting target generated power with the correction power amount, the target generated power being the generated power determined in accordance with the required power; and a control unit that can control a power generation device based on the corrected target generated power.

4 Claims, 9 Drawing Sheets

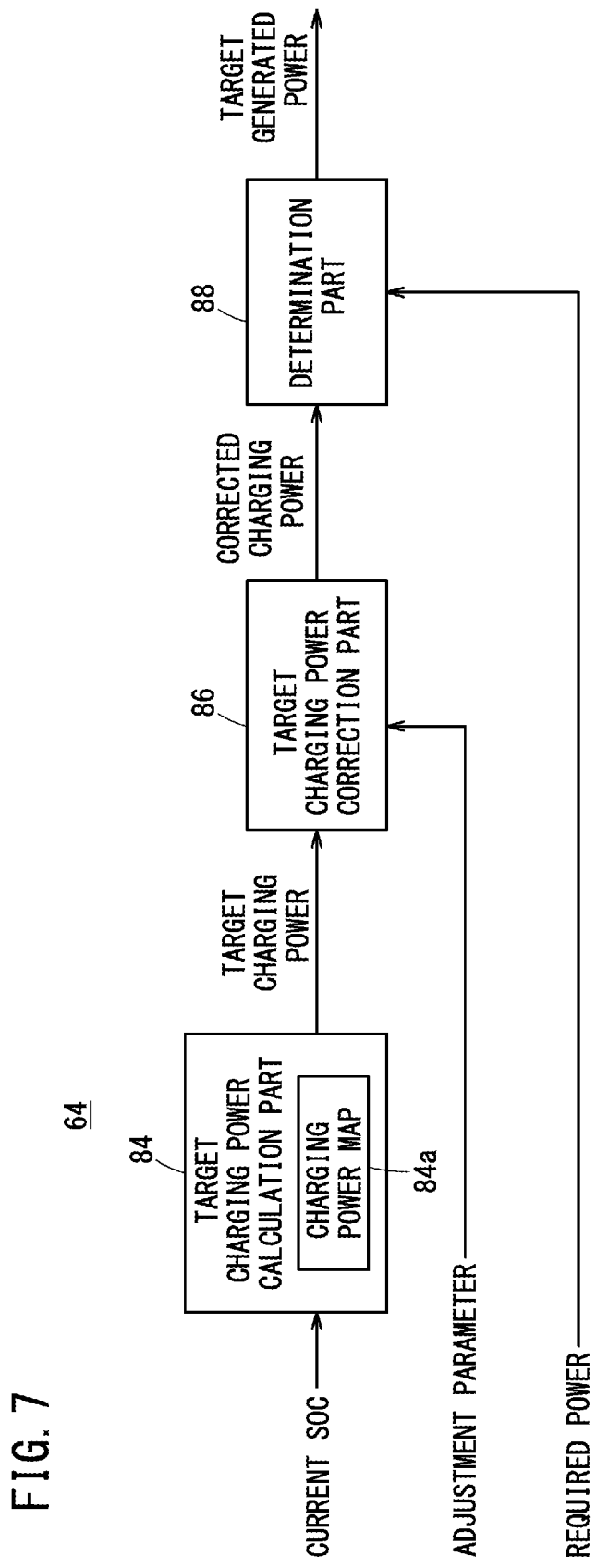

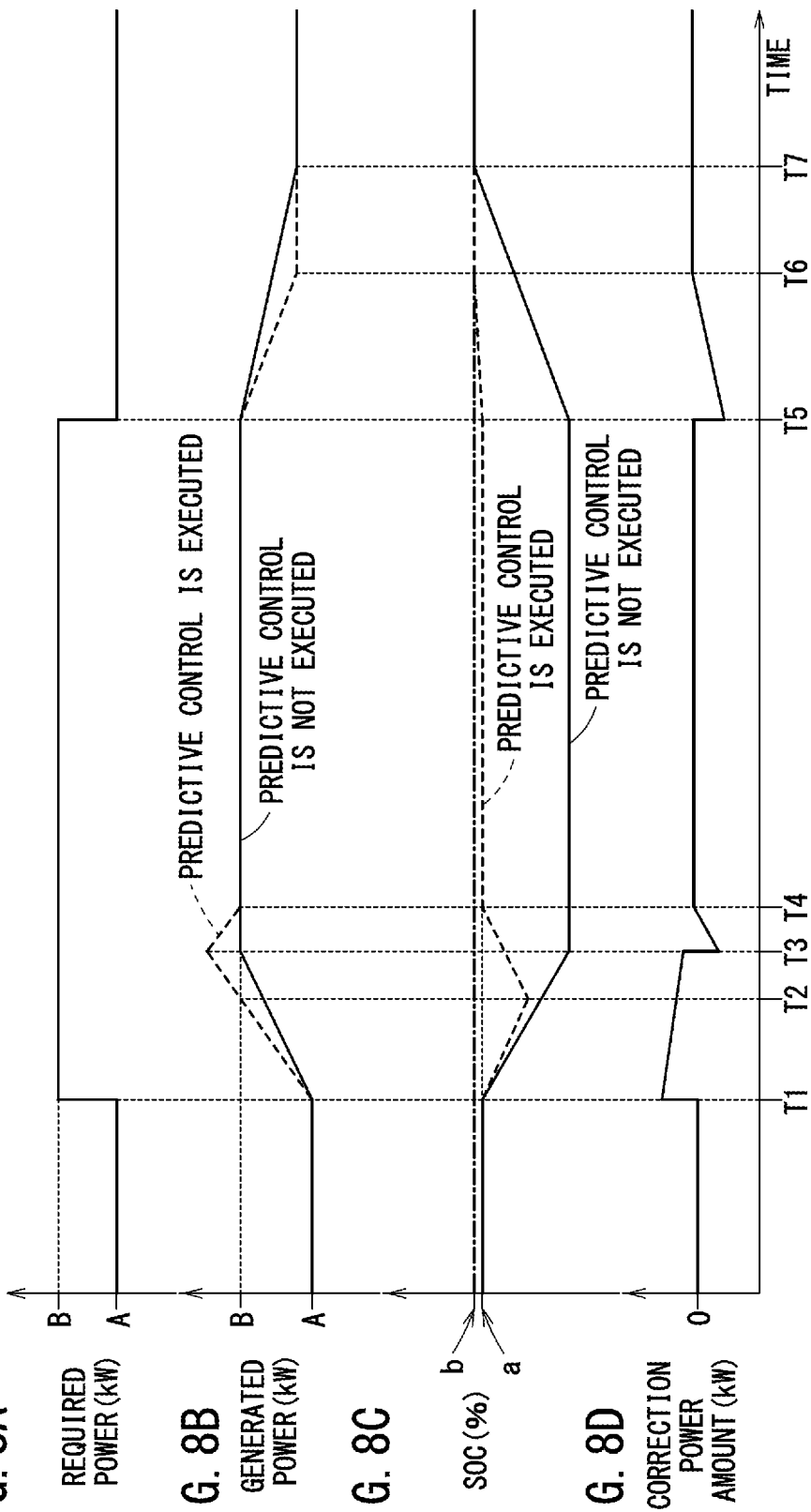

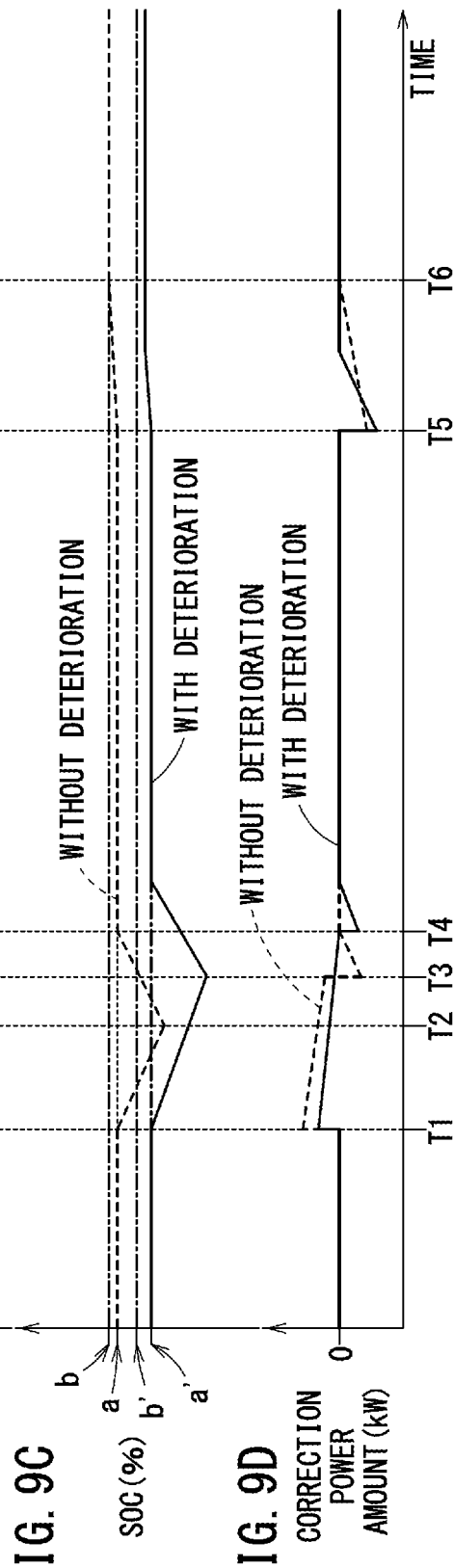

POWER SUPPLY SYSTEM AND MOVING OBJECT

CROSS-REFERENCE TO RELATED APPLICATIONS

This application is based upon and claims the benefit of priority from Japanese Patent Application No. 2023-045128 filed on Mar. 22, 2023, the contents of which are incorporated herein by reference.

BACKGROUND OF THE INVENTION

Field of the Invention

The present invention relates to a power supply system and a moving object.

Description of the Related Art

In recent years, research and development have been conducted on electrification technology that contributes to energy efficiency in order to ensure that more people have access to affordable, reliable, sustainable and modern energy.

JP 2019-077361 A discloses an aircraft (helicopter) equipped with a hybrid electric propulsion system. The propeller of the aircraft is coupled to the output shaft of a gas turbine engine and the rotor of a rotating electric machine. Normally, the gas turbine engine drives the propeller and the rotating electric machine, and the rotating electric machine generates electric power. That is, the gas turbine engine and the rotating electric machine function as power generation devices. Note that the rotating electric machine can function as a motor as necessary to apply a force to the output shaft of the gas turbine engine.

SUMMARY OF THE INVENTION

There has been a demand for a more satisfactory power supply system and a more satisfactory moving object.

An object of the present invention is to solve the above-mentioned problem.

A power supply system of the present invention comprises: a power generation device including an engine and a generator driven by the engine; a load device configured to be operated by electric power supplied from the power generation device; a power storage device configured to be charged with the electric power supplied from the power generation device and to supply electric power to the load device; a prediction unit configured to, based on required power that is electric power required to operate the load device, generated power that is electric power generated by the power generation device, and a current state of charge of the power storage device, predict a predicted state of charge that is a state of charge of the power storage device obtained after a predetermined time; a correction power amount determination unit configured to determine a correction power amount used to reduce a deviation between the predicted state of charge and a target state of charge that is the state of charge to be achieved; a target generated power correction unit configured to determine corrected target generated power by correcting target generated power with the correction power amount, the target generated power being the generated power determined in accordance with the required power; and a control unit configured to control the power generation device based on the corrected target generated power.

A moving object of the present invention comprises the above-described power supply system.

According to the present invention, it is possible to provide a satisfactory power supply system and a satisfactory moving object.

The above and other objects, features, and advantages of the present invention will become more apparent from the following description when taken in conjunction with the accompanying drawings, in which a preferred embodiment of the present invention is shown by way of illustrative example.

BRIEF DESCRIPTION OF THE DRAWINGS

FIG. 7 is a block diagram showing a configuration of a target generated power determination unit;
FIG. 8A is a time chart of required power;
FIG. 8B is a time chart of generated power;
FIG. 8C is a time chart of the SOC of a power storage device;
FIG. 8D is a time chart of a correction power amount determined by the correction power amount determination unit;
FIG. 9A is a time chart of the required power;
FIG. 9B is a time chart of the generated power;
FIG. 9C is a time chart of the SOC of the power storage device;
and
FIG. 9D is a time chart of the correction power amount determined by the correction power amount determination unit.

DETAILED DESCRIPTION OF THE INVENTION

For example, in an aircraft equipped with a power generation device and a power storage device, the power generation device normally supplies electric power to a load device. On the other hand, when electric power required by the aircraft (required power) exceeds electric power generated by the power generation device (generated power), the power storage device supplies electric power to the load device. When the required power exceeds the generated power for a long time, the remaining capacity of the power storage device decreases. When the remaining capacity of the power storage device decreases, there is a concern that power shortage may occur. According to the embodiment described below, it is possible to reduce a decrease in the remaining capacity of the power storage device.

[Moving Object 10]

Figure 1:
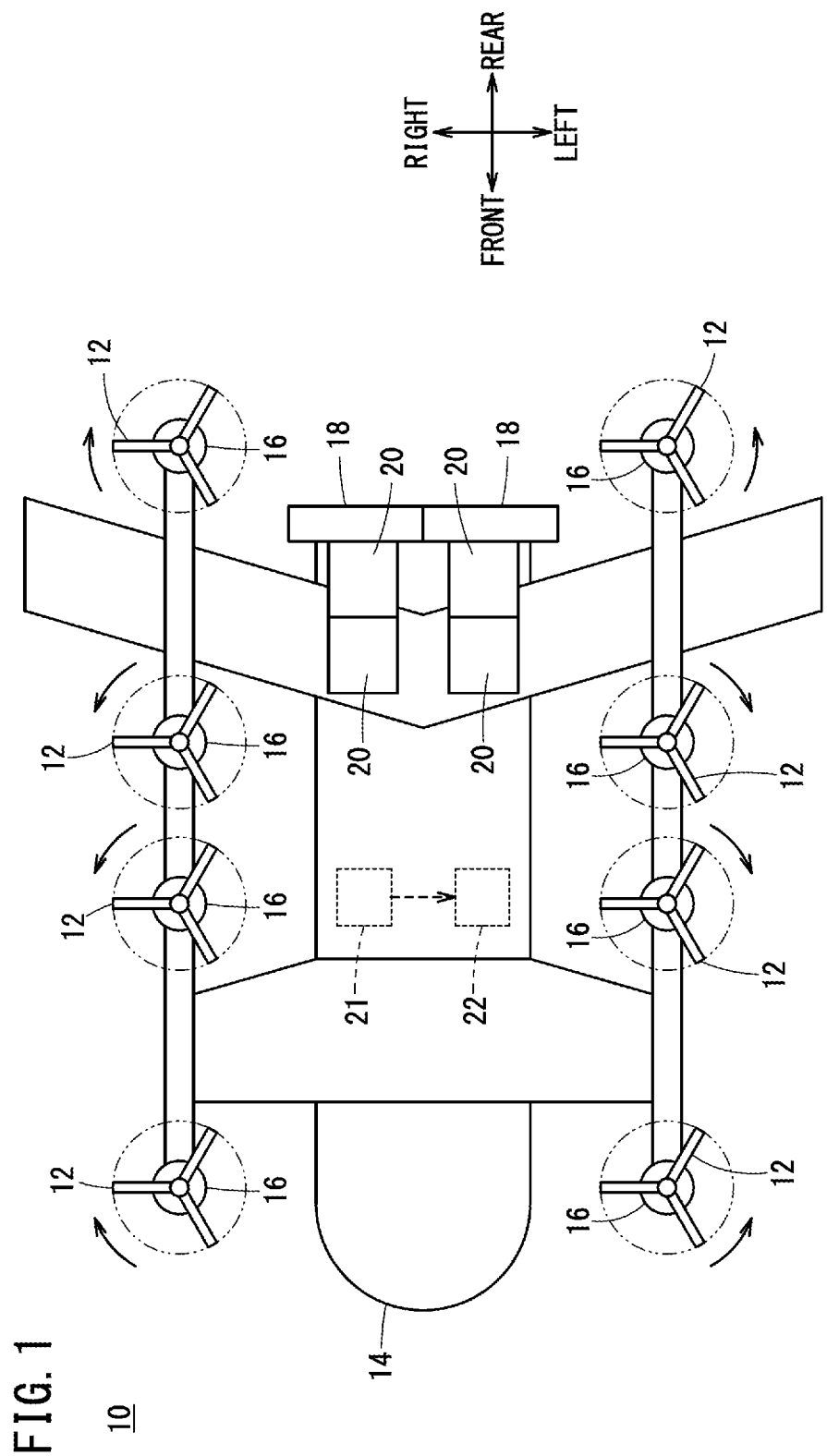
FIG. 1 is a schematic view of a moving object.

FIG. 1 is a schematic view of a moving object 10. A power supply system 22 can be mounted on the moving object 10. The moving object 10 is, for example, an electric vertical take-off and landing aircraft (eVTOL aircraft). The moving object 10 includes eight VTOL rotors 12. The VTOL rotors 12 generate upward thrust for a fuselage 14. The moving object 10 includes eight electric motors 16. One electric motor 16 drives one VTOL rotor 12. The moving object 10 includes two cruise rotors 18. The cruise rotors 18 generate forward thrust for the fuselage 14. The moving object 10 includes four electric motors 20. Two electric motors 20 drive one cruise rotor 18.

Figure 2:
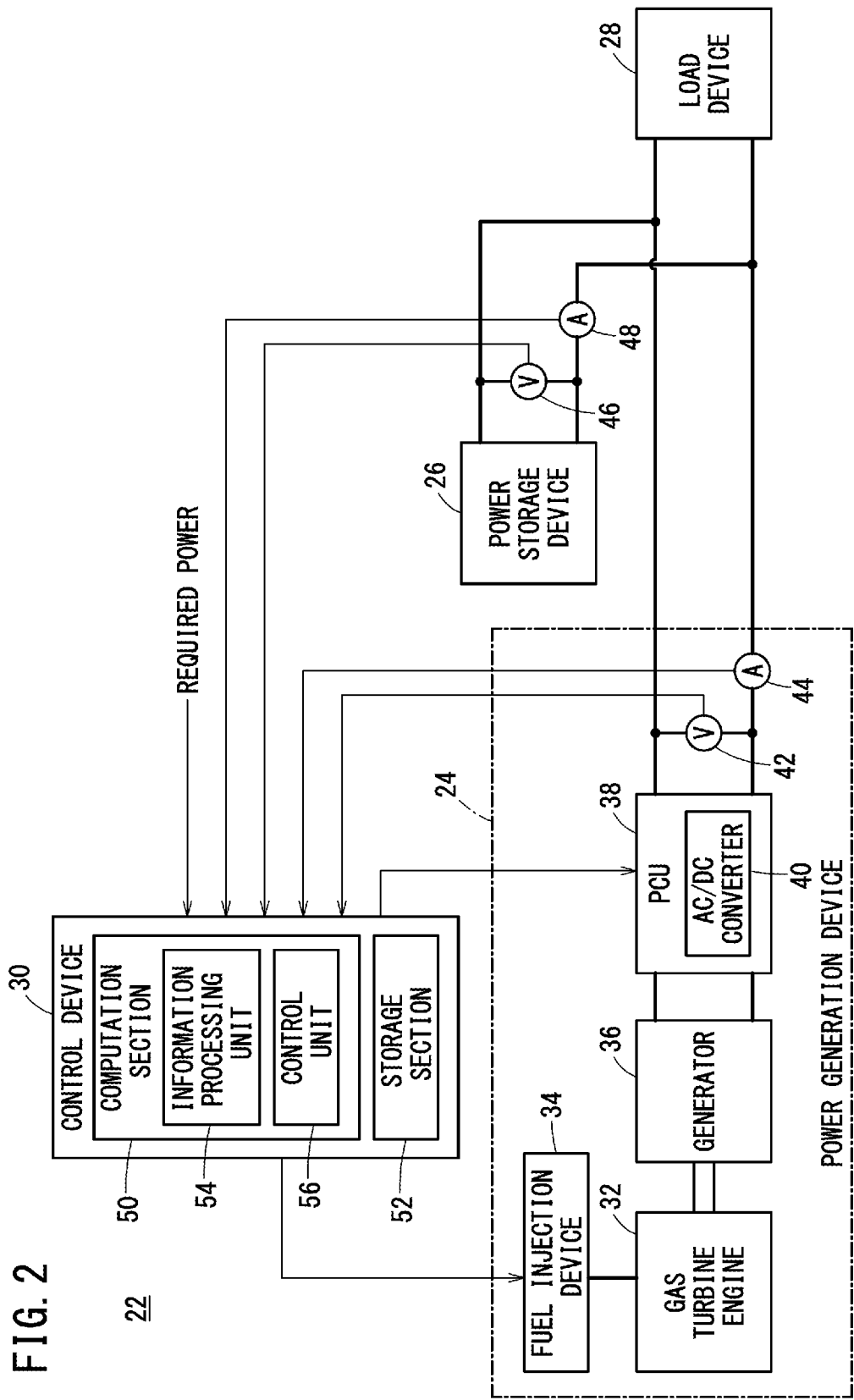
FIG. 2 is a schematic view of a power supply system.

The moving object 10 is equipped with the power supply system 22. Each of the electric motors 16 and 20 is a load device 28 (FIG. 2) to which electric power from the power supply system 22 is supplied. The load device 28 is not limited to the electric motors 16 and 20. The moving object 10 can include a plurality of load devices 28. For ease of illustration, one load device 28 of the plurality of load devices 28 is shown in FIG. 2.

The moving object 10 includes a controller 21 that manages information related to electric power. The controller 21 calculates electric power required to operate some or all of the load devices 28 of the moving object 10, and outputs an operation request to the power supply system 22. Based on the operation request, the power supply system 22 (a control device 30) determines the electric power required by the moving object 10. This electric power is referred to as required power. The required power is electric power required to operate the load device 28.

The moving object 10 is not limited to an aircraft, and may be a ship, an automobile, a train, or the like. Further, the power supply system 22 may be used in facilities, factories, and the like, in addition to the moving object 10.

[Power Supply System 22]

FIG. 2 is a schematic view of the power supply system 22. The power supply system 22 includes a power generation device 24, a power storage device 26, the load device 28, and the control device 30. The load device 28 is electrically connected to the power generation device 24 so as to be operated by electric power supplied from the power generation device 24. The power storage device 26 is electrically connected to the power generation device 24 and the load device 28 so as to be charged with electric power supplied from the power generation device 24 and to supply electric power to the load device 28.

The power generation device 24 includes a gas turbine engine 32 (engine), a fuel injection device 34, a generator 36, and a power control unit 38. The gas turbine engine 32 drives the generator 36. The fuel injection device 34 includes an injector (not shown). The rotational speed of the gas turbine engine 32 can be changed by controlling the injector. The generator 36 is driven by the gas turbine engine 32 to generate three-phase AC power. The power control unit 38 converts the three-phase AC power into DC power. The power control unit 38 includes an AC/DC converter 40. The AC/DC converter 40 includes a switching element (not shown). By controlling the switching element provided in the AC/DC converter 40, the electric power supplied from the power generation device 24 to the power storage device 26 and the electric power supplied from the power generation device 24 to the load device 28 can be controlled.

The power storage device 26 includes, for example, a lithium ion battery. The power storage device 26 may have a secondary battery other than the lithium ion battery. The power storage device 26 may include a large-capacity capacitor.

The load device 28 includes an inverter (not shown) and the electric motors 16 and 20 (FIG. 1). The inverter converts input DC power into three-phase AC power. The electric motors 16 and 20 are driven by the three-phase AC power supplied from the inverter. The load device 28 may include a DC/DC converter and a low-voltage drive device (both of which are not shown). The DC/DC converter lowers the voltage of DC power input to the DC/DC converter. The low-voltage drive device is driven by the DC power supplied from the DC/DC converter.

The power supply system 22 includes a voltage sensor 42, a current sensor 44, a voltage sensor 46, and a current sensor 48. The voltage sensor 42 detects a voltage between terminals of the power generation device 24. The current sensor 44 detects a current output from the power generation device 24. The voltage sensor 46 detects a voltage between terminals of the power storage device 26. The current sensor 48 detects a current output from the power storage device 26.

The power supply system 22 includes the control device 30. The control device 30 acquires signals indicating the voltages from the voltage sensors 42 and 46. The control device 30 acquires signals indicating the currents from the current sensors 44 and 48. The control device 30 controls the injector provided in the fuel injection device 34 of the power generation device 24. The control device 30 controls the switching element provided in the AC/DC converter 40 of the power generation device 24.

The control device 30 includes a computation section 50 and a storage section 52. The computation section 50 is, for example, a processor such as a central processing unit (CPU) or a graphics processing unit (GPU). The computation section 50 controls each device by executing a program stored in the storage section 52. At least part of the computation section 50 may be realized by an integrated circuit such as an application specific integrated circuit (ASIC) or a field-programmable gate array (FPGA). At least part of the computation section 50 may be realized by an electronic circuit including a discrete device.

The computation section 50 functions as an information processing unit 54 and a control unit 56. The information processing unit 54 sets a target value of the electric power generated by the power generation device 24. The control unit 56 controls the power generation device 24 based on the target value of the electric power that has been set.

The storage section 52 is constituted by a volatile memory (not shown) and a non-volatile memory (not shown) which are computer-readable storage media. The volatile memory is, for example, a random access memory (RAM) or the like. The non-volatile memory is, for example, a read only memory (ROM), a flash memory, or the like. Data and the like are stored in, for example, the volatile memory. Programs, tables, maps, and the like are stored in, for example, the non-volatile memory. At least part of the storage section 52 may be included in the processor, the integrated circuit, or the like described above.

[Generated Power Control Process]

The response of the gas turbine engine 32 to a command is slow due to the structure thereof. Further, the gas turbine engine 32 is normally operated at high efficiency. Even when it is desired to rapidly increase the rotation of the gas turbine engine 32, efficiency is prioritized normally. Therefore, the gas turbine engine 32 cannot be driven with a high response to the command. In addition, response delays occur in the respective sensors. For this reason, a time lag occurs from the time when the required power for the moving object 10 exceeds the generated power of the power generation device 24 to the time when the power generation device 24 can output the required power for the moving object 10. During this time lag, electric power is supplied from the power storage device 26 to the load device 28. A generated power control process performed by the power supply system 22 is a process for reducing the power supply from the power storage device 26.

Figure 3:
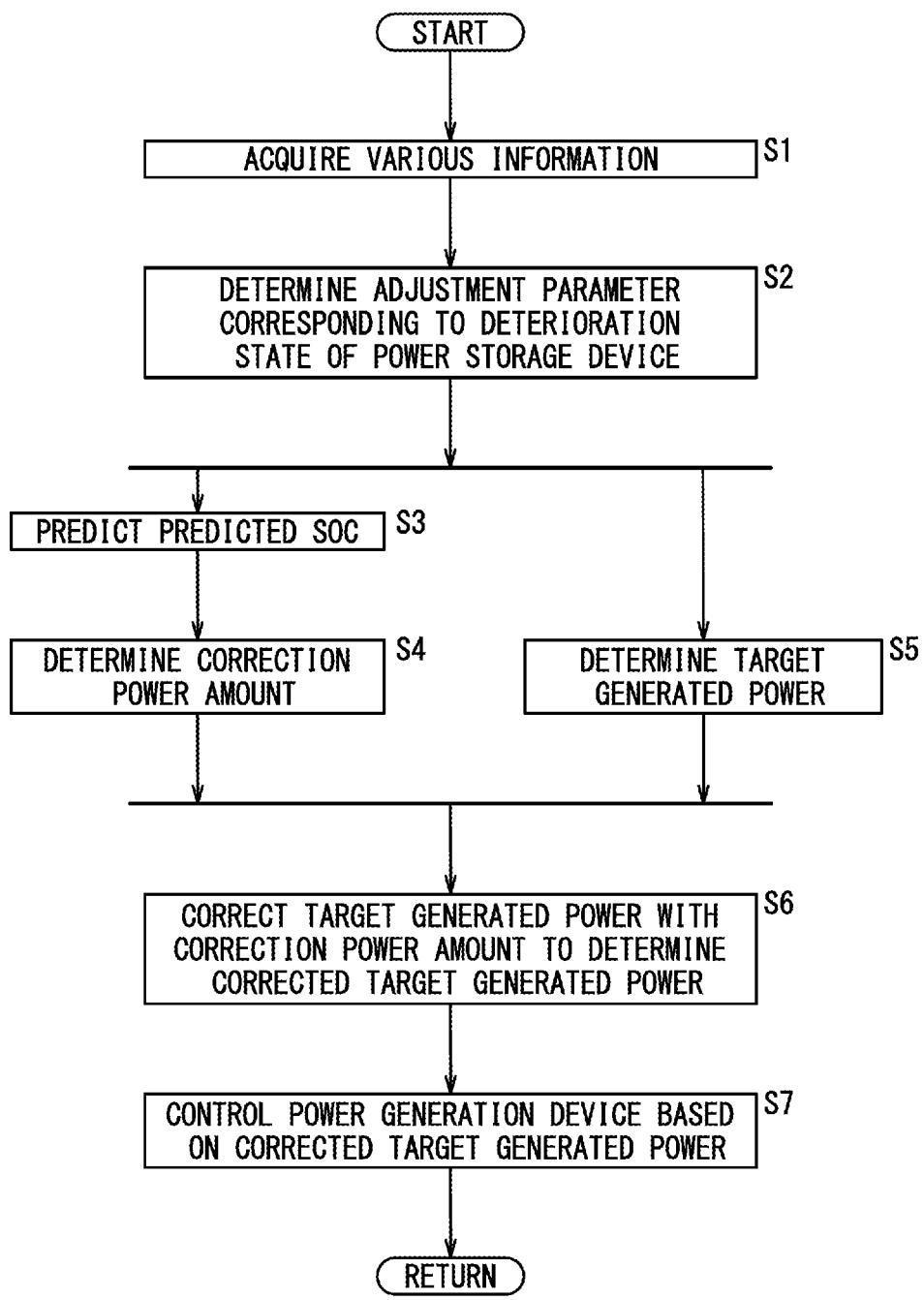
FIG. 3 is a flowchart of a generated power control process performed by a computation section.
Figure 4:
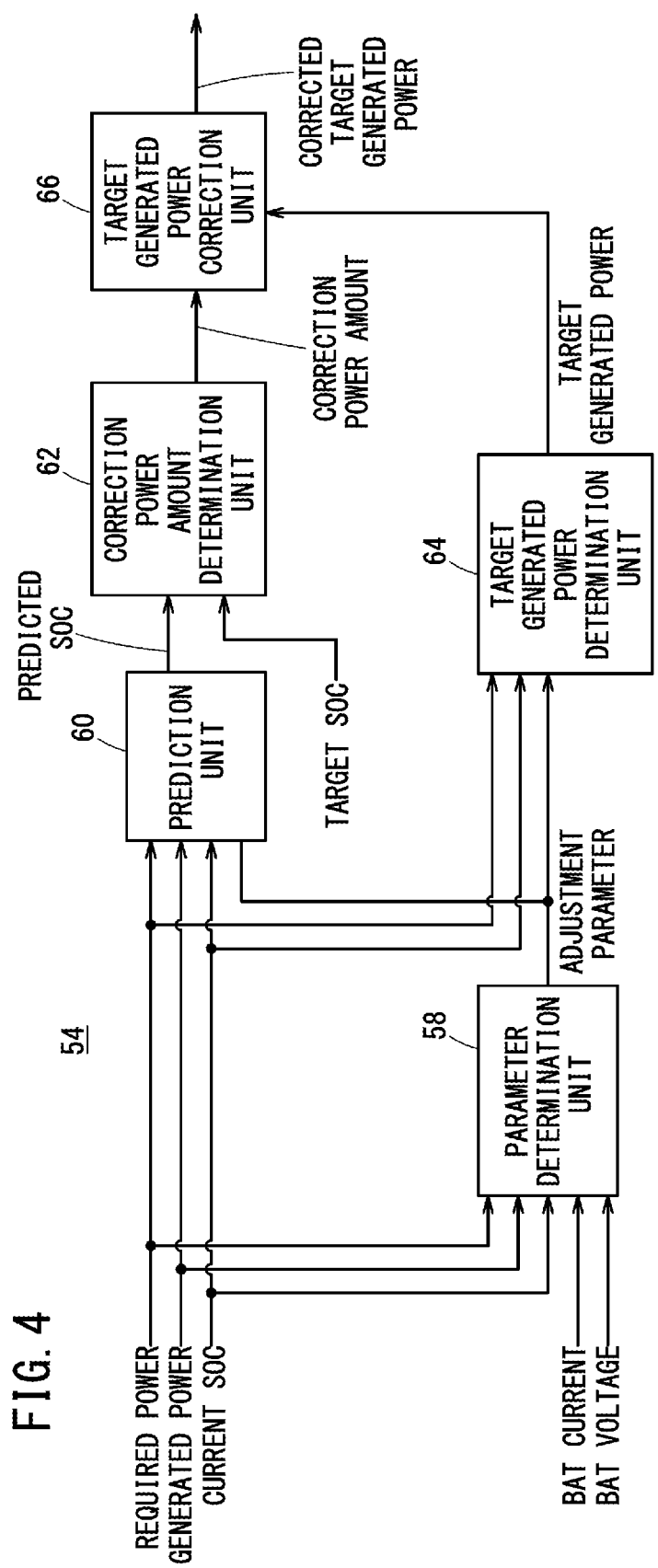
FIG. 4 is a block diagram showing a configuration of an information processing unit.

FIG. 3 is a flowchart of the generated power control process performed by the computation section 50. FIG. 4 is a block diagram showing a configuration of the information processing unit 54. As shown in FIG. 4, the information processing unit 54 includes a plurality of processing units (a parameter determination unit 58, a prediction unit 60, a correction power amount determination unit 62, a target generated power determination unit 64, and a target generated power correction unit 66). Each of the processing units shown in FIG. 4 executes any one of the processes of steps S2 to S6 shown in FIG. 3.

In step S1, the information processing unit 54 acquires various information for executing the generated power control process. The information processing unit 54 acquires the required power based on the operation request acquired from the controller 21. The information processing unit 54 acquires information (voltage values and current values) indicating the detection results from the voltage sensors 42 and 46 and the current sensors 44 and 48. In addition to the voltage values and the current values, the information processing unit 54 acquires information (a temperature and the like) necessary for calculating a state of charge (SOC) from a sensor (not shown). The information processing unit 54 calculates the SOC of the power storage device 26 at the current time based on the voltage value detected by the voltage sensor 46, the current value detected by the current sensor 48, and the information such as the temperature. This SOC is referred to as a current SOC. The information processing unit 54 calculates generated power currently generated by the power generation device 24, based on the voltage value detected by the voltage sensor 42 and the current value detected by the current sensor 44.

In step S2, the information processing unit 54 determines an adjustment parameter corresponding to a deterioration state (a state of health (SOH)) of the power storage device 26. The adjustment parameter is a parameter for reflecting the deterioration state of the power storage device 26 in a calculation result (corrected target generated power) of the information processing unit 54. The process of step S2 is performed by the parameter determination unit 58 shown in FIG. 4. The parameter determination unit 58 will be described with reference to FIG. 5.

Figure 5:
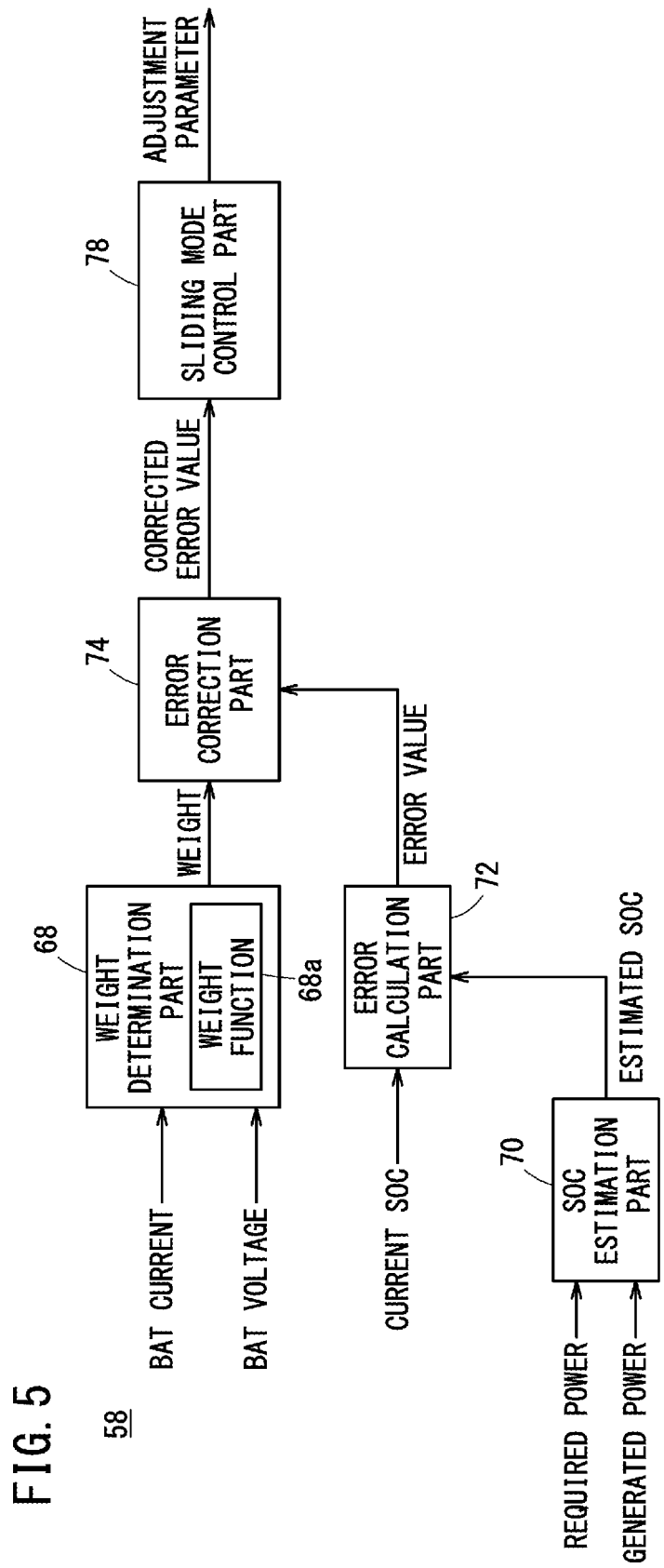
FIG. 5 is a block diagram showing a configuration of a parameter determination unit.

FIG. 5 is a block diagram showing a configuration of the parameter determination unit 58. The parameter determination unit 58 includes respective processing parts (a weight determination part 68, an SOC estimation part 70, an error calculation part 72, an error correction part 74, and a sliding mode control part 78) shown in FIG. 5.

The weight determination part 68 determines a weight based on the voltage value (a BAT voltage) detected by the voltage sensor 46, the current value (a BAT current) detected by the current sensor 48, and a weight function 68*a*. The weight function 68*a* is a function that associates, with each other, the BAT current, the BAT voltage, and a weight corresponding to the degree of deterioration of the power storage device 26. The weight function 68*a* can be created based on a deterioration model of the power storage device 26, based on experimental results, simulation results, or the like. Further, the weight function 68*a* can be created based on a deterioration model using the Arrhenius equation. The weight function 68*a* is stored in the storage section 52 in advance.

The SOC estimation part 70 estimates the current SOC of the power storage device 26. The SOC estimation part 70 estimates the current SOC based on required power information indicating the required power, and generated power information indicating the generated power. The SOC estimation part 70 calculates a difference between the required power and the generated power at each predetermined calculation cycle. The difference between the required power and the generated power in each calculation cycle corresponds to input/output power of the power storage device 26 in each calculation cycle. The SOC estimation part 70 calculates a total value of the input/output power of the power storage device 26 by adding up all the differences. Further, the SOC estimation part 70 divides a subtraction value obtained by subtracting the calculated total value from a capacity value (full charge capacity) of the power storage device 26 that is not deteriorated, by the capacity value of the power storage device 26 that is not deteriorated. Based on the above calculation, the SOC estimation part 70 calculates an estimated value of the SOC of the power storage device 26. This SOC is referred to as an estimated SOC. Note that the required power and the generated power in the past are stored in the storage section 52. The capacity value of the power storage device 26 is also stored in the storage section 52.

The error calculation part 72 calculates an error value between the current SOC calculated in step S1, and the estimated SOC estimated by the SOC estimation part 70. For example, the error calculation part 72 calculates the error value by subtracting the estimated SOC from the current SOC.

The error correction part 74 corrects the error value calculated by the error calculation part 72, by using the weight determined by the weight determination part 68. For example, the error correction part 74 calculates a corrected error value by multiplying the error value by the weight.

The sliding mode control part 78 performs sliding mode control using the corrected error value as an input value, and calculates an adjustment parameter. The value of the adjustment parameter is greater than 0 and less than 1. The adjustment parameter is used by the prediction unit 60 and the target generated power determination unit 64 shown in FIG. 4. As a result, the deterioration state of the power storage device 26 is reflected in the target generated power (the corrected target generated power) finally determined by the information processing unit 54. Note that the adjustment parameter may be calculated by control other than the sliding mode control.

When each of the processing parts of the parameter determination unit 58 performs the above processing, the process of step S2 is ended.

Returning to FIG. 3, the description of the generated power control process will be continued. When step S2 is ended, the information processing unit 54 executes the process of step S3 and the process of step S5 in parallel.

In step S3, the information processing unit 54 predicts a predicted SOC. The predicted SOC is the SOC of the power storage device 26 calculated in the next calculation cycle in a case where the current operating state of the power generation device 24 and the current power input/output state of the load device 28 are continued. The process of step S3 is performed by the prediction unit 60 shown in FIG. 4. The prediction unit 60 calculates the predicted SOC by the following Equation (1).

$$SOCpre(k) = \alpha 1 \cdot SOCact(k) + \alpha 2 \cdot SOCact(k-1) + \sum \beta i \cdot \varphi in(k-i) \quad \text{Equation (1)}$$

SOCpre(k): predicted SOC
SOCact(k): current SOC in current calculation cycle
SOCact(k−1): current SOC in previous calculation cycle
φin(k−i): input/output power of power storage device 26 (required power-generated power) in calculation cycle i times before
α1: coefficient of SOCact(k)
α2: coefficient of SOCact(k−1)
βi: coefficient of φin(k−i)
α1, α2, and βi (i=1, 2, . . . , n−1, n) are determined in the design stage of the prediction unit 60. α1, α2, and βi are stored in the storage section 52 in advance. However, α1, α2, and βi may be corrected based on the adjustment parameter determined by the parameter determination unit 58 in step S2. Specifically, the prediction unit 60 may correct each coefficient based on the adjustment parameter and calculate the predicted SOC (SOCpre(k)) using the above Equation (1). In this case, the prediction unit 60 uses α1' that is obtained by multiplying α1 by the adjustment parameter, uses α2' that is obtained by multiplying α2 by the adjustment parameter, and uses βi' that is obtained by multiplying βi by the adjustment parameter.

In step S4, the information processing unit 54 determines a correction power amount. The correction power amount is an amount of electric power for reducing a deviation between a target SOC, which is the SOC to be achieved, and the predicted SOC. The target SOC is normally a constant value. The target SOC is stored in the storage section 52 in advance. The process of step S4 is performed by the correction power amount determination unit 62 shown in FIG. 4. The correction power amount determination unit 62 will be described with reference to FIG. 6.

Figure 6:
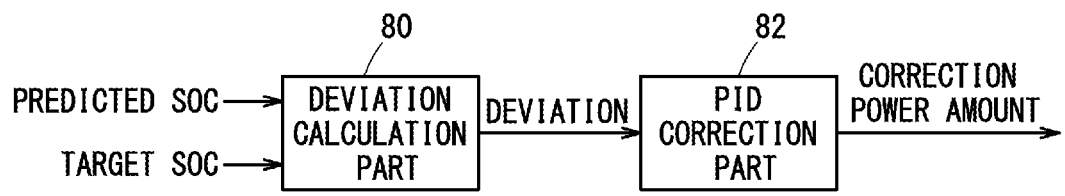
FIG. 6 is a block diagram showing a configuration of a correction power amount determination unit.

FIG. 6 is a block diagram showing a configuration of the correction power amount determination unit 62. The correction power amount determination unit 62 includes respective processing parts (a deviation calculation part 80 and a PID control part 82) shown in FIG. 6.

The deviation calculation part 80 calculates a deviation between the predicted SOC predicted by the prediction unit 60 in step S3 and a predetermined target SOC. For example, the deviation calculation part 80 calculates the deviation by subtracting the target SOC from the predicted SOC.

The PID control part 82 performs proportional integral differential (PID) control. The PID control part 82 determines the correction power amount for reducing the deviation between the target SOC and the predicted SOC. Note that the correction power amount may be determined by control other than the PID control (for example, the sliding mode control).

When each of the processing parts of the correction power amount determination unit 62 performs the above processing, the process of step S4 is ended.

Returning to FIG. 3, the description of the generated power control process will be continued. The information processing unit 54 executes the process of step S5 in parallel with the process of step S3 and the process of step S4.

In step S5, the information processing unit 54 determines target generated power. The target generated power is the generated power of the power generation device 24 determined based on the required power and the current SOC. The target generated power is the electric power not taking into account the predicted SOC (the amount of fluctuation in the SOC). The process of step S5 is performed by the target generated power determination unit 64 shown in FIG. 4. The target generated power determination unit 64 will be described with reference to FIG. 7.

FIG. 7 is a block diagram showing a configuration of the target generated power determination unit 64. The target generated power determination unit 64 includes respective processing parts (a target charging power calculation part 84, a target charging power correction part 86, and a determination part 88) shown in FIG. 7.

The target charging power calculation part 84 determines target charging power based on the current SOC calculated in step S1 and a charging power map 84a. The charging power map 84a is a map in which the current SOC and the target charging power are associated with each other. The charging power map 84a is stored in the storage section 52 in advance.

According to the deterioration state of the power storage device 26, the target charging power correction part 86 corrects the target charging power calculated by the target charging power calculation part 84. For example, the target charging power correction part 86 corrects the target charging power by multiplying the target charging power by the adjustment parameter. Thus, the target charging power correction part 86 calculates corrected charging power.

The determination part 88 determines the target generated power based on the required power acquired in step S1 and the corrected charging power calculated by the target charging power correction part 86. For example, the determination part 88 calculates the target generated power by adding the corrected charging power to the required power.

When each of the processing parts of the target generated power determination unit 64 performs the above processing, the process of step S5 is ended.

Returning to FIG. 3, the description of the generated power control process will be continued. When the process of step S4 and the process of step S5 are ended, the information processing unit 54 executes the process of step S6.

In step S6, the information processing unit 54 corrects the target generated power with the correction power amount to determine corrected target generated power. The process of step S6 is performed by the target generated power correction unit 66 shown in FIG. 4.

The target generated power correction unit 66 adds the correction power amount determined by the correction power amount determination unit 62 in step S4, to the target generated power determined by the target generated power determination unit 64 in step S5. Thus, the target generated power correction unit 66 determines the corrected target generated power.

As described above, the information processing unit 54 finally determines the corrected target generated power by executing the processes of steps S1 to S6.

In step S7, the control unit 56 controls the power generation device 24 with the corrected target generated power. For example, the control unit 56 changes the rotational speed of the gas turbine engine 32 by controlling the fuel injection device 34. Further, the control unit 56 controls the generated power of the generator 36 by controlling the torque of the generator 36. For example, the control unit 56 controls the switching element of the AC/DC converter 40.

Advantageous Effects of Present Embodiment

The computation section 50 predicts the SOC of the power storage device 26 obtained after a predetermined time, and corrects the target generated power based on the prediction result. This control is referred to as predictive control. The effects of the present embodiment will be described by comparing a case where the predictive control is executed and a case where the predictive control is not executed with each other using FIGS. 8A to 8D.

FIG. 8A is a time chart of the required power. FIG. 8B is a time chart of the generated power. FIG. 8C is a time chart of the SOC of the power storage device 26. FIG. 8D is a time chart of the correction power amount determined by the correction power amount determination unit 62. In FIGS. 8B and 8C, the time charts in the case where the predictive control is not executed are indicated by solid lines, and the time charts in the case where the predictive control is executed are indicated by broken lines.

As shown in FIG. 8A, the required power increases from power A to power B at a time point T1. On the other hand, as shown in FIG. 8B, the generated power is the power A at the time point T1. In this way, at the time point T1, a power difference B−A occurs between the required power and the generated power.

First, the operation in the case where the predictive control is not executed will be described. The power generation device 24 generates electric power while operating the gas turbine engine 32 at optimal efficiency. As a result, at a time point T3, the generated power reaches the power B, which is the same as the required power. While the power difference between the required power and the generated power occurs (from the time point T1 to the time point T3), the power storage device 26 supplies the electric power corresponding to the difference to the load device 28. Therefore, the SOC of the power storage device 26 starts to decrease from the time point T1, and the decrease in the SOC of the power storage device 26 stops at the time point T3.

At the time point T3, since the required power and the generated power become equal to each other, the input/output power of the power storage device 26 becomes substantially zero. Therefore, the power storage device 26 maintains the SOC obtained at the time point T3. In this manner, the power storage device 26 maintains a state where the SOC thereof is lowered. For example, when a large amount of power is further required in a state where the SOC of the power storage device 26 is kept low, the power storage device 26 may not be able to compensate for the power that is further required.

Next, the operation in the case where the predictive control is executed will be described. The computation section 50 starts the generated power control process shown in FIG. 3 at the time when it is detected that the power difference B−A becomes equal to or greater than a predetermined difference. Here, at the time point T1, the computation section 50 starts the generated power control process. At the time point T1, the information processing unit 54 of the computation section 50 predicts that the SOC of the power storage device 26 after the predetermined time will be decreased. Therefore, as shown in FIG. 8D, the information processing unit 54 (the correction power amount determination unit 62) sets the correction power amount (>0) according to the predicted SOC. As a result, as shown in FIG. 8B, the control unit 56 of the computation section 50 increases the generated power more than that in the case where the predictive control is not executed. Then, the electric power supplied from the power storage device 26 to the load device 28 decreases. Therefore, as shown in FIG. 8C, the decrease rate in the SOC of the power storage device 26 is reduced compared to the case where the predictive control is not executed.

In the case of the present embodiment, at a time point T2 earlier than the time point T3, the generated power reaches the power B, which is the same as the required power. At this time point T2, the decrease in the SOC of the power storage device 26 stops. The computation section 50 of the present embodiment executes control for bringing the SOC of the power storage device 26 after the predetermined time close to a target SOC (a [%] in FIG. 8C). Therefore, after the time point T2 as well, the information processing unit 54 (the correction power amount determination unit 62) sets the correction power amount (>0) according to the predicted SOC. Then, the generated power exceeds the required power, and surplus power is generated. The surplus power is supplied to the power storage device 26, and the power storage device 26 is charged. Therefore, the SOC of the power storage device 26 starts to increase from the time point T2.

At the time point T3, the deviation between the target SOC and the predicted SOC predicted by the information processing unit 54 (the prediction unit 60) decreases. That is, the SOC of the power storage device 26 approaches the target SOC. As shown in FIG. 8D, the information processing unit 54 (the correction power amount determination unit 62) sets the correction power amount (<0) according to the predicted SOC. As a result, as shown in FIG. 8B, the control unit 56 of the computation section 50 reduces the generated power. At a time point T4, the generated power reaches the power B, which is the same as the required power. At this time point T4, the SOC of the power storage device 26 reaches the target SOC (a [%]).

In this manner, according to the present embodiment, the SOC (the predicted SOC) of the power storage device 26 after the predetermined time is predicted, and the power generation device 24 is controlled in advance so that the predicted SOC approaches the target SOC. As a result, when a difference occurs between the required power and the generated power, the generated power of the power generation device 24 can be quickly increased. Therefore, the electric power supplied from the power storage device 26 to the load device 28 can be reduced. That is, according to the present embodiment, the amount of input/output power of the power storage device 26 can be reduced. As a result, according to the present embodiment, it is possible to provide the satisfactory power supply system 22 and the satisfactory moving object 10.

The target SOC (a [%]) of the present embodiment is set to be lower than an SOC (b [%]) at the time of full charge. This is to prepare for unexpected charging. The fully charged power storage device 26 cannot absorb surplus power when the generated power exceeds the required power. According to the present embodiment, the target SOC is set to be lower than the full charge SOC so that such surplus power can be absorbed.

At a time point T5, the required power decreases from the power B to the power A. When the predictive control is not executed, as shown in FIG. 8C, the power storage device 26 in the low SOC state needs to be fully charged. In order to fully charge the power storage device 26, a time from the time point T5 to a time point T7 is required. In contrast, in the case of the present embodiment in which the predictive control is executed, the SOC is already in a state close to the fully charged state as shown in FIG. 8C. In this case, in order to fully charge the power storage device 26, a time from the time point T5 to a time point T6 is required. This time is shorter than the time from the time point T5 to the time point T7. In this manner, according to the present embodiment, when the required power decreases, the rotational speed of the power generation device 24 can be quickly decreased.

Next, the control in a case where the power storage device 26 is not deteriorated and the control in a case where the power storage device 26 is deteriorated are compared with each other using FIGS. 9A to 9D.

FIG. 9A is a time chart of the required power. FIG. 9B is a time chart of the generated power. FIG. 9C is a time chart of the SOC of the power storage device 26. FIG. 9D is a time chart of the correction power amount determined by the correction power amount determination unit 62. The time charts of "no deterioration" (indicated by broken lines) shown in FIGS. 9B to 9D are the same as the time charts in the case where the predictive control is executed (indicated by broken lines) shown in FIGS. 8B to 8D.

The deteriorated power storage device 26 has a lower upper limit of the SOC than the power storage device 26 that is not deteriorated. Specifically, the deteriorated power storage device 26 has a smaller chargeable capacity and is more likely to be overcharged than the power storage device 26 that is not deteriorated. As shown in FIG. 9D, in the case where the power storage device 26 is deteriorated, the information processing unit 54 (the correction power amount determination unit 62) makes the correction power amount smaller than the correction power amount in the case where the power storage device 26 is not deteriorated (the time point T1 to the time point T3). Further, as shown in FIG. 9C, in the case where the power storage device 26 is deteriorated, a target SOC (a' [%]) is set to be lower than the target SOC (a [%]) in the case where the power storage device 26 is not deteriorated. In this manner, the information processing unit 54 reduces the charging speed for the deteriorated power storage device 26.

It should be noted that, in the present embodiment, the generated power control process can be performed in accordance with the deterioration state of the power storage device 26 by using the adjustment parameter. However, the adjustment parameter may not be used if the target SOC is set to a value obtained in consideration of the deterioration regardless of whether the power storage device 26 is deteriorated. That is, the computation section 50 may not perform the process executed by the parameter determination unit 58.

APPENDICES

The following notes (appendices) are further disclosed in relation to the above-described embodiment.

APPENDIX 1

The power supply system (22) includes: the power generation device (24) including the engine (32) and the generator (36) driven by the engine; the load device (28) configured to be operated by electric power supplied from the power generation device; the power storage device (26) configured to be charged with the electric power supplied from the power generation device and to supply electric power to the load device; the prediction unit (60) configured to, based on the required power that is electric power required to operate the load device, the generated power that is electric power generated by the power generation device, and the current SOC of the power storage device, predict the predicted SOC that is the SOC of the power storage device obtained after a predetermined time; the correction power amount determination unit (62) configured to determine the correction power amount used to reduce the deviation between the predicted SOC and the target SOC that is the SOC to be achieved; the target generated power correction unit (66) configured to determine the corrected target generated power by correcting the target generated power with the correction power amount, the target generated power being the generated power determined in accordance with the required power; and the control unit (56) configured to control the power generation device based on the corrected target generated power.

In the above configuration, the SOC (the predicted SOC) of the power storage device after the predetermined time is predicted, and the power generation device is controlled in advance so that the predicted SOC approaches the target SOC. As a result, when a difference occurs between the required power and the generated power, the generated power of the power generation device can be quickly increased. Therefore, the electric power supplied from the power storage device to the load device can be reduced. That is, according to the above configuration, the amount of input/output power of the power storage device can be reduced. As a result, according to the above configuration, a satisfactory power supply system can be provided.

APPENDIX 2

The power supply system according to Appendix 1 may further include the target generated power determination unit (64) configured to determine the target generated power based on the required power and the current SOC.

APPENDIX 3

The power supply system according to Appendix 2 may further include the parameter determination unit (58) configured to determine the adjustment parameter corresponding to the deterioration state of the power storage device, wherein the prediction unit may predict the predicted SOC corresponding to the deterioration state of the power storage device by using the adjustment parameter, and the target generated power determination unit may determine the target generated power corresponding to the deterioration state of the power storage device by using the adjustment parameter.

APPENDIX 4

The moving object (10) includes the power supply system according to any one of Appendices 1 to 3.

The present invention is not limited to the above disclosure, and various modifications are possible without departing from the essence and gist of the present invention.

The invention claimed is:
1. A power supply system comprising:
a power generation device including an engine and a generator driven by the engine;
a load device configured to be operated by electric power supplied from the power generation device;
a power storage device configured to be charged with the electric power supplied from the power generation device and to supply electric power to the load device; and
one or more processors that execute computer-executable instructions stored in a memory, wherein the one or more processors execute the computer-executable instructions to cause the power supply system to:

based on required power that is electric power required to operate the load device, generated power that is electric power generated by the power generation device, and a current state of charge of the power storage device, predict a predicted state of charge that is a state of charge of the power storage device obtained after a predetermined time;

determine a correction power amount used to reduce a deviation between the predicted state of charge and a target state of charge that is the state of charge to be achieved;

determine corrected target generated power by correcting target generated power with the correction power amount, the target generated power being the generated power determined in accordance with the required power; and control the power generation device based on the corrected target generated power.

2. The power supply system according to claim 1, wherein the one or more processors cause the power supply system to determine the target generated power based on the required power and the current state of charge.

3. The power supply system according to claim 2, wherein the one or more processors cause the power supply system to:

determine an adjustment parameter corresponding to a deterioration state of the power storage device;

predict the predicted state of charge corresponding to the deterioration state of the power storage device by using the adjustment parameter; and determine the target generated power corresponding to the deterioration state of the power storage device by using the adjustment parameter.

4. A moving object comprising the power supply system according to claim 1.

* * * * *